US008982849B1

(12) United States Patent
Salhotra et al.

(10) Patent No.: US 8,982,849 B1
(45) Date of Patent: Mar. 17, 2015

(54) COEXISTENCE MECHANISM FOR 802.11AC COMPLIANT 80 MHZ WLAN RECEIVERS (71) Applicant: Marvell International Ltd., Hamilton (BM)

(72) Inventors: Atul Salhotra, Santa Clara, CA (US); Ping Gao, Cupertino, CA (US); Bo Wang, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 132 days.

(21) Appl. No.: 13/713,813

(22) Filed: Dec. 13, 2012

Related U.S. Application Data (60) Provisional application No. 61/576,277, filed on Dec. 15, 2011.

(51) Int. Cl.
*H04W 4/00* (2009.01)
*H04W 72/04* (2009.01)
(52) U.S. Cl.
CPC ................................. *H04W 72/0453* (2013.01)
USPC .......................................... 370/334; 370/338
(58) Field of Classification Search
USPC .......................................... 370/328, 338, 334
See application file for complete search history.

(56) References Cited

U.S. PATENT DOCUMENTS

| 5,884,010 | A | 3/1999 | Chen et al. |
| 6,507,605 | B1 | 1/2003 | Fukumoto et al. |
| 7,212,798 | B1 | 5/2007 | Adams et al. |
| 7,295,599 | B1 | 11/2007 | Karsi |
| 7,403,539 | B1 | 7/2008 | Tang et al. |
| 7,430,257 | B1 | 9/2008 | Shattil |
| 7,631,029 | B2 | 12/2009 | Marsili |
| 7,804,917 | B2 | 9/2010 | French et al. |
| 7,821,976 | B2 | 10/2010 | Kim et al. |
| 7,924,930 | B1 | 4/2011 | Salhotra et al. |
| 8,009,724 | B2 * | 8/2011 | Razzell et al. ................ 375/150 |
| 8,275,323 | B1 | 9/2012 | Shirali et al. |
| 8,369,469 | B1 | 2/2013 | Salhotra et al. |
| 8,369,657 | B2 | 2/2013 | Chan et al. |
| 8,838,038 | B1 | 9/2014 | Shirali et al. |
| 2003/0112911 | A1 | 6/2003 | Barton et al. |
| 2003/0123530 | A1 | 7/2003 | Maeda et al. |

(Continued)

OTHER PUBLICATIONS

IEEE 802.11-04/0889r6; IEEE P802.11 Wireless LANs; TGn Sync Proposal Technical Specification; Agere Systems Inc., Syed Aon Mujtaba, 555 Union Blvd., Allentown, PA 18109, U.S.A.; May 18, 2005; 131 pages.

(Continued)

*Primary Examiner* — Andrew Lee (57) ABSTRACT

A wireless network device comprising a physical layer (PHY) module and a media access control (MAC) module. The PHY module is configured to communicate with an 80 MHz channel. The 80 MHz channel includes a plurality of sub-bands including a first sub-band, a second sub-band, a third sub-band, and a fourth sub-band. One of the plurality of sub-bands corresponds to a primary channel. The PHY module is further configured to determine which of the plurality of sub-bands are receiving a data packet, and generate at least one clear channel assessment signal indicating which of the plurality of sub-bands are receiving the data packet. The MAC module is configured to receive the at least one clear channel assessment signal from the PHY module, and selectively transmit on the primary channel based on the at least one clear channel assessment signal.

20 Claims, 7 Drawing Sheets

(56) References Cited

U.S. PATENT DOCUMENTS

| | | |
|---|---|---|
| 2003/0236081 A1 | 12/2003 | Braun |
| 2004/0019492 A1 | 1/2004 | Tucker et al. |
| 2004/0116112 A1 | 6/2004 | Gray |
| 2004/0120424 A1 | 6/2004 | Roberts |
| 2004/0218568 A1 | 11/2004 | Goodall et al. |
| 2004/0235439 A1 | 11/2004 | Husted et al. |
| 2005/0041693 A1 | 2/2005 | Priotti |
| 2005/0079826 A1 | 4/2005 | He |
| 2005/0128985 A1 | 6/2005 | Liberti et al. |
| 2005/0141630 A1 | 6/2005 | Catreux et al. |
| 2005/0163264 A1 | 7/2005 | Nakao et al. |
| 2005/0180314 A1 | 8/2005 | Webster et al. |
| 2005/0180353 A1 | 8/2005 | Hansen et al. |
| 2005/0185699 A1 | 8/2005 | Feher |
| 2005/0265498 A1 | 12/2005 | Gunzelmann et al. |
| 2006/0025178 A1 | 2/2006 | Tao et al. |
| 2006/0062336 A1 | 3/2006 | Kang et al. |
| 2006/0133462 A1 | 6/2006 | Nguyen et al. |
| 2006/0146869 A1 | 7/2006 | Zhang et al. |
| 2006/0159003 A1 | 7/2006 | Nanda et al. |
| 2006/0166634 A1 | 7/2006 | Ido |
| 2007/0002890 A1* | 1/2007 | Mangold et al. ............ 370/459 |
| 2007/0041398 A1 | 2/2007 | Benveniste |
| 2007/0060155 A1 | 3/2007 | Kahana et al. |
| 2007/0091813 A1 | 4/2007 | Richard et al. |
| 2007/0104280 A1 | 5/2007 | Ibrahim et al. |
| 2007/0117527 A1 | 5/2007 | Xu et al. |
| 2007/0121705 A1 | 5/2007 | French et al. |
| 2007/0133473 A1 | 6/2007 | Takagi et al. |
| 2007/0153881 A1 | 7/2007 | Arslan |
| 2007/0264950 A1* | 11/2007 | Husted et al. ............... 455/136 |
| 2007/0266157 A1 | 11/2007 | Xhafa et al. |
| 2007/0286122 A1 | 12/2007 | Fonseca |
| 2007/0298810 A1 | 12/2007 | Kasher et al. |
| 2008/0002643 A1 | 1/2008 | Octaviano et al. |
| 2008/0051040 A1 | 2/2008 | Shen et al. |
| 2008/0089222 A1* | 4/2008 | Kim et al. .................... 370/208 |
| 2008/0144596 A1 | 6/2008 | Dankberg et al. |
| 2008/0151849 A1 | 6/2008 | Utsunomiya et al. |
| 2008/0162127 A1 | 7/2008 | Laaksonen et al. |
| 2008/0186231 A1* | 8/2008 | Aljadeff et al. ............... 342/387 |
| 2010/0172427 A1 | 7/2010 | Kleider et al. |
| 2012/0057492 A1 | 3/2012 | Goel et al. |
| 2012/0106665 A1 | 5/2012 | Nakao |
| 2012/0207036 A1* | 8/2012 | Ong et al. .................... 370/252 |
| 2012/0250532 A1* | 10/2012 | Husted et al. ................ 370/252 |
| 2013/0017794 A1* | 1/2013 | Kloper et al. ............... 455/63.1 |
| 2013/0051256 A1* | 2/2013 | Ong et al. .................... 370/252 |
| 2013/0064184 A1* | 3/2013 | Ishii ............................ 370/328 |

OTHER PUBLICATIONS

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 23 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11h™-2003 (Amendment to IEEE Std 802.11™, 1999 Edition (Reaff 2003), as amended by IEEE Stds 802.11a™-1999, 802.11b™-1999, 802.11b™-1999/Cor 1-2001, 802.11d™-2001, and 802.11g™-2003); IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; LAN/MAN Standards Committee of the IEEE Computer Society; Oct. 14, 2003; 74 pages.

IEEE Std 802.15.1™-2002; IEEE Standard for Information technology—Telecommunications and information exchange between systems—Local and metropolitan area networks—Specific requirements; Part 15.1: Wireless Medium Access Control (MAC) and Physical Layer (PHY) Specifications for Wireless Personal Area Networks (WPANs); IEEE Computer Society; Sponsored by the LAN/MAN Standards Committee; Jun. 14, 2002; 1169 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.

International Standard; ISO/IEC 8802-11; ANSI/IEEE Std 802.11 First edition 1999-00-00; Information technology—Telecommunications and information exchange between systems—Local and metropolitan area networks—Specific requirements—Part 11: Wireless LAN Medium Access Control (MAC) and Physical Layer (PHY) specifications; 531 pages.

IEEE P802.11ac™/D2.1; Draft Standard for Information Technology Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz, Mar. 2012, 338 pages.

* cited by examiner

COEXISTENCE MECHANISM FOR 802.11AC COMPLIANT 80 MHZ WLAN RECEIVERS

CROSS-REFERENCE TO RELATED APPLICATIONS

This present disclosure claims the benefit of U.S. Provisional Application No. 61/576,277, filed on Dec. 15, 2011. The present disclosure is related to U.S. patent application Ser. No. 11/827,958 (now U.S. Pat. No. 8,275,323) filed on Jul. 13, 2007. The entire disclosures of the above applications are incorporated herein by reference.

FIELD

The present disclosure relates to wireless communication systems, and more particularly to coexistence systems and methods for wireless local area network receivers operating in wireless communication systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

I.E.E.E. sections 802.11, 802.11(a), 802.11(b), 802.11(g), 802.11(h), and 802.11(n) (collectively sections 802.11), which are incorporated herein by reference in their entirety, define ways for configuring wireless networks and devices. According to these standards, wireless network devices may operate in either an ad-hoc mode or an infrastructure mode.

Figure 1:
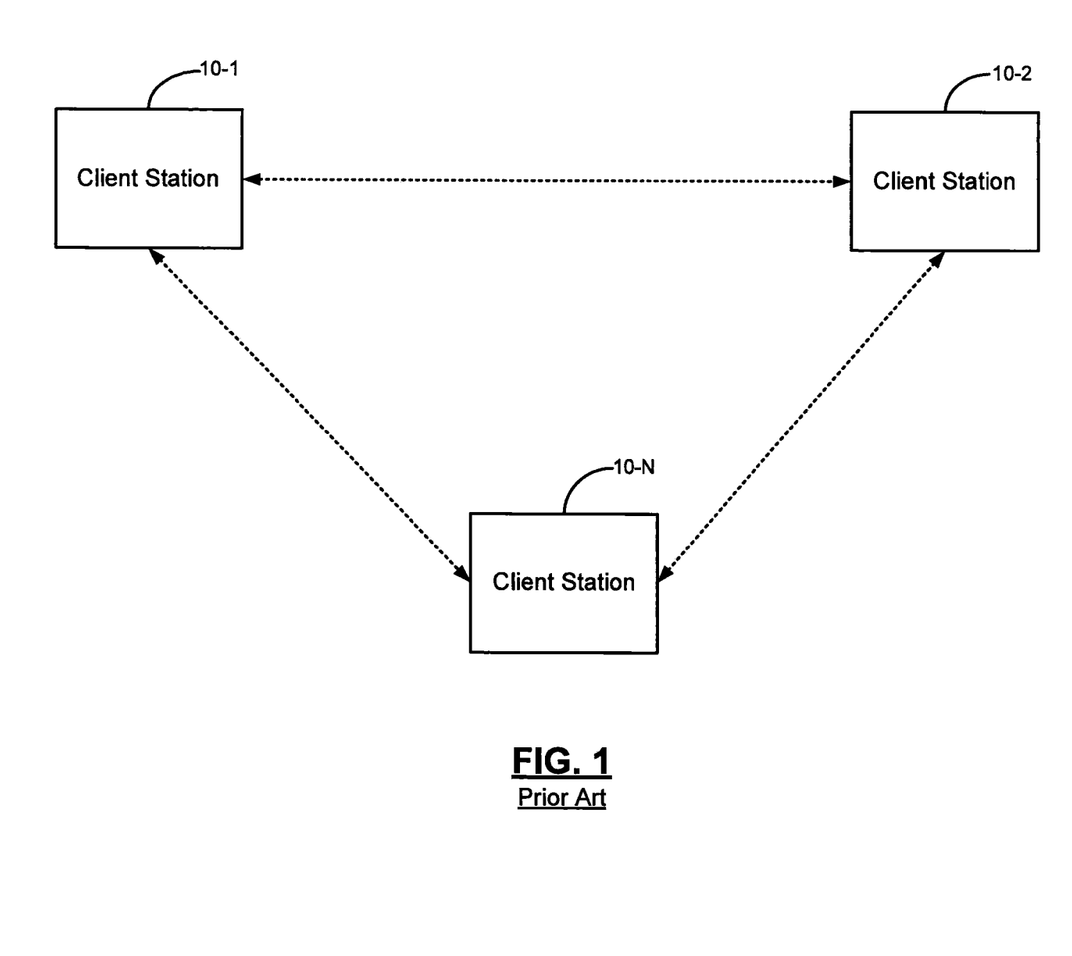
FIG. 1 is a functional block diagram of a wireless network operating in ad-hoc mode according to the prior art.
Figure 2:
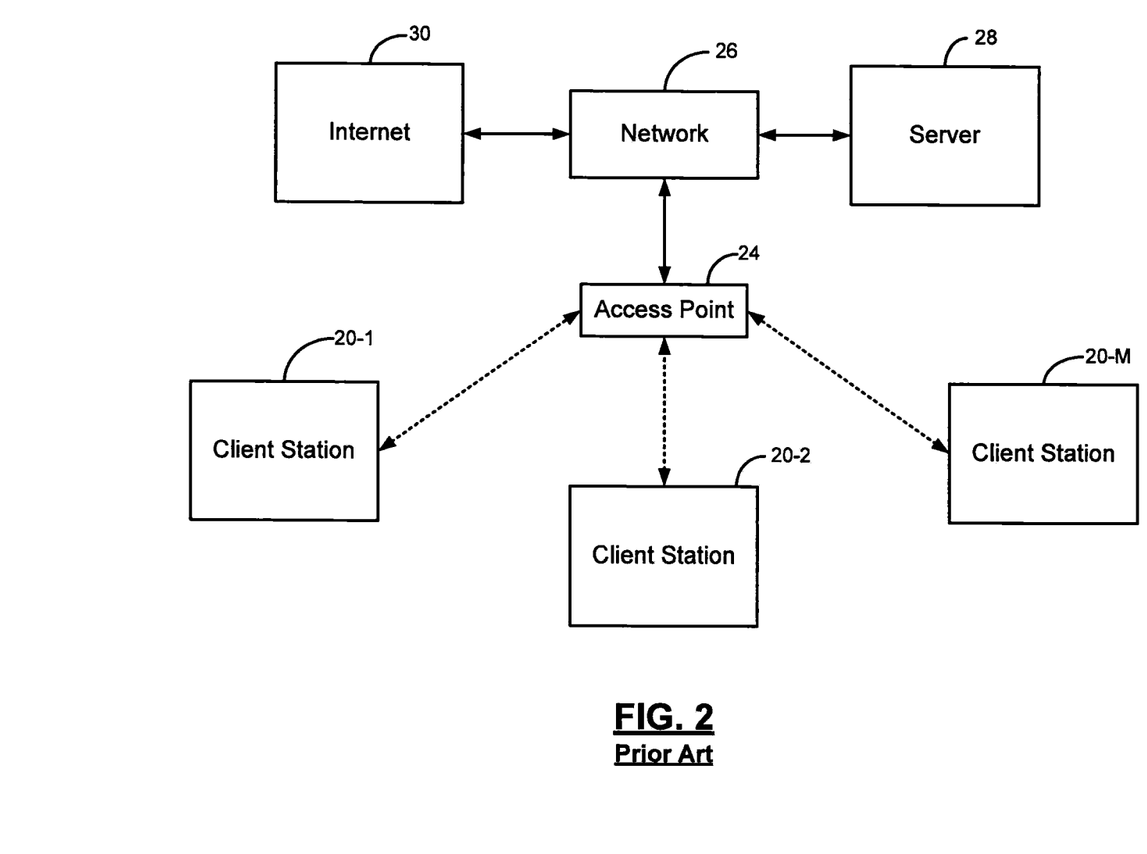
FIG. 2 is a functional block diagram of a wireless network operating in infrastructure mode according to the prior art.

Referring now to FIGS. 1 and 2, in the ad-hoc mode, each client station 10-1, 10-2, . . . , and 10-N (collectively client stations 10) communicates directly with other client stations 10 without requiring an access point (AP). In FIG. 2, in the infrastructure mode, each client station 20-1, 20-2, . . . , and 20-M (collectively client stations 20) communicates with other client stations 20 through an AP 24. The AP 24 may provide a connection to a network 26, a server 28, and/or the Internet 30.

Figure 3A:
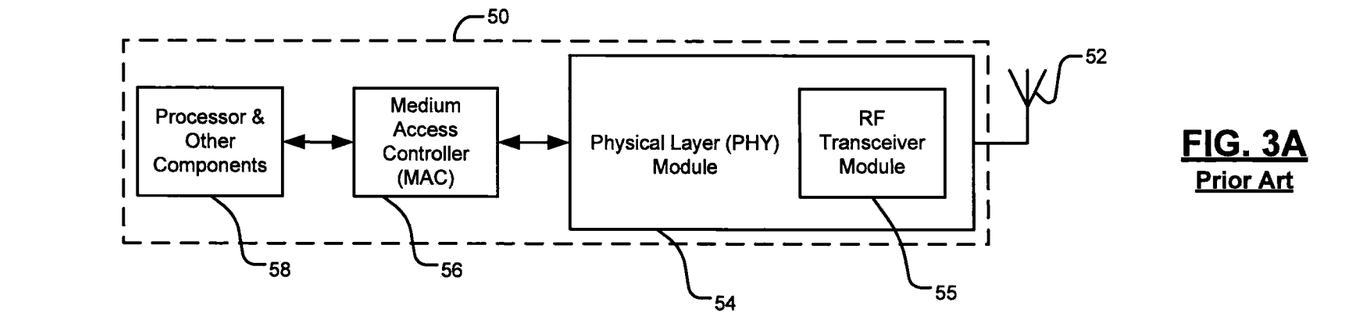
FIG. 3A is a functional block diagram of a wireless network device according to the prior art.
Figure 3B:
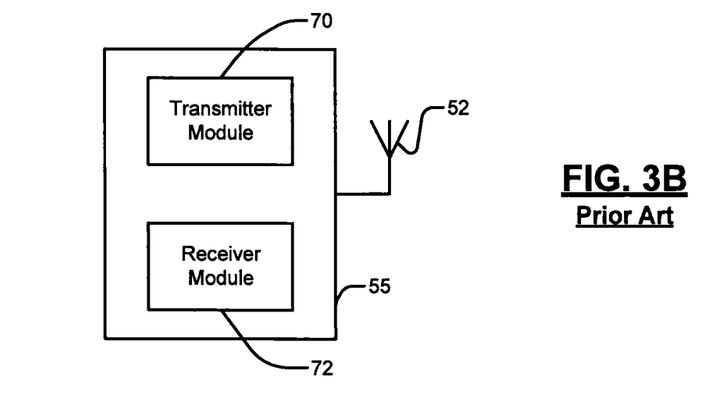
FIG. 3B is a functional block diagram of a transceiver in a wireless network device according to the prior art.

Referring generally to FIGS. 3A-3B, a wireless network device (hereinafter device) 50 is shown. The device 50 may be the AP 24 or one of the client stations 10, 20. In FIG. 3A, the device 50 may comprise at least one antenna 52, a physical layer (PHY) module 54, and a medium access controller (MAC) module 56. Additionally, the device 50 may include a processor 58 and other components. The PHY module 54 may communicate with the medium (e.g., air) via the antenna 52. The PHY module 54 may comprise a radio frequency (RF) transceiver module 55 that transmits and receives data to and from the medium via the antenna 52. The MAC module 56 may communicate with the PHY module 54 and the processor 58.

In FIG. 3B, the RF transceiver module 55 may comprise a transmitter module 70 that transmits data and a receiver module 72 that receives data in the form of modulated RF carriers via the antenna 52. The transmitter module 70 may comprise an encoder module, a modulator module, an analog-to-digital converter (ADC) module, etc. (all not shown). The receiver module 72 may comprise an automatic gain control (AGC) module, a filter module, an ADC converter module, a demodulator module, a decoder module, etc. (all not shown).

802.11 provides that data may be simultaneously transmitted via multiple channels in a predetermined frequency-band. For example, devices that comply with section 802.11(a) may transmit data at 20 MHz via eight 20 MHz channels in a 5 GHz frequency-band; devices that comply with section 802.11(b) may transmit data at 20 MHz via fourteen 20 MHz channels in a 2.4 GHz frequency-band, etc.

Devices that comply with section 802.11(n) may transmit data at 20 MHz or 40 MHz via a 40 MHz channel. The 40 MHz channel may comprise two 20 MHz channels. A first 20 MHz channel is called a primary channel or a control channel. A second 20 MHz channel is called a secondary channel or an extension channel. The 802.11(n)-compliant devices may transmit data at 40 MHz via the 40 MHz channel when communicating with other 802.11(n)-compliant devices. Additionally, 802.11(n)-compliant devices may transmit data at 20 MHz via the control channel when communicating with the devices that comply with 802.11 sections other than 802.11(n).

A wireless network (hereinafter network) may include devices that comply with different 802.11 sections. For example, the network may comprise the AP 24 and a first set of client stations 20 that complies with section 802.11(n). Additionally, the network may include a second set of client stations 20 that comply with 802.11 sections other than section 802.11(n) (e.g., 802.11(a), 802.11(b), 802.11(g), etc.). The AP 24 may transmit and receive data at 40 MHz via the 40 MHz channel when communicating with the first set of client stations 20 and may transmit and receive data via the 20 MHz control channel when communicating with the second set of client stations 20.

Occasionally, the AP 24 may transmit data at 40 MHz when data transmitted by devices in other networks may be present in the extension channel. For example, other networks may include devices that comply with 802.11 sections other than section 802.11(n) and that transmit data at 20 MHz in a channel that may overlap with the 20 MHz extension channel of the AP 24. Consequently, collisions may occur when the AP 24 transmits data at 40 MHz.

Additionally, collisions may occur when the AP 24 transmits data at 40 MHz while other devices that comply with 802.11 sections other than section 802.11(n) communicate in the network at 20 MHz via the extension channel. Collisions may also occur when multiple devices that comply with the section 802.11(n) simultaneously transmit data in the network.

When collisions occur, data may get corrupted. Corrupted data may be discarded when received. When data received is corrupted, the data may have to be retransmitted. Thus, collisions may decrease throughput and quality of service (QoS) of the network.

To minimize collisions, devices in wireless networks utilize a carrier sense multiple access (CSMA) protocol to determine when a channel is free to transmit data. Ideally, only one device may transmit data via the channel at a given time. Typically, the devices "listen" for activity (e.g., the devices sense presence or absence of RF carriers) in the channel before transmitting data via that channel. Listening for activity is generally referred to as carrier sensing (CS). Since multiple devices perform carrier sensing by simultaneously accessing the medium (e.g., air), the protocol is called carrier sense multiple access protocol. Activity in the channel may also be sensed by performing energy detection (ED), wherein presence or absence of RF energy in the channel is detected.

Specifically, the PHY module 54 may generate clear channel assessments (CCAs) for the control and extension channels based on whether radio frequency (RF) activity is present or absent in the channel. The CCAs may indicate whether the channels are busy or free. Typically, the CCA for the channel is asserted (e.g., when CCA=1) when a channel is busy, and the CCA for the channel is cleared when the channel is free (e.g., when CCA=0). The terms clear, free, and idle are used interchangeably and synonymously throughout this disclosure.

The PHY module 54 may communicate the CCAs to the MAC module 56. Based on the CCAs, the MAC module 56 may decide whether to transmit data via the channel. For example, the MAC module 56 may decide that data may be transmitted via a channel when the channel is free (e.g., when CCA=0). Additionally, the MAC module 56 may decide to "back off" (i.e., to not transmit data) when the channel is busy (e.g., when CCA=1).

SUMMARY

A wireless network device includes a physical layer (PHY) module and a media access control (MAC) module. The PHY module is configured to communicate with an 80 MHz channel. The 80 MHz channel includes a plurality of sub-bands including a first sub-band, a second sub-band, a third sub-band, and a fourth sub-band. One of the plurality of sub-bands corresponds to a primary channel. The PHY module is further configured to determine which of the plurality of sub-bands are receiving a data packet, and generate at least one clear channel assessment signal indicating which of the plurality of sub-bands are receiving the data packet. The MAC module is configured to receive the at least one clear channel assessment signal from the PHY module, and selectively transmit on the primary channel based on the at least one clear channel assessment signal.

A method of operating a wireless network device includes communicating with an 80 MHz channel including a plurality of sub-bands, wherein the sub-bands include a first sub-band, a second sub-band, a third sub-band, and a fourth sub-band, and wherein one of the plurality of sub-bands corresponds to a primary channel. The method further includes determining which of the plurality of sub-bands are receiving a data packet, generating at least one clear channel assessment signal indicating which of the plurality of sub-bands are receiving the data packet, and selectively transmitting on the primary channel based on the at least one clear channel assessment signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

In wireless network devices that comply with I.E.E.E. section 802.11(n), physical layer (PHY) modules provide medium access controller (MAC) modules clear channel assessments (CCAs) for control and extension channels. Based on the CCAs (e.g., based on whether the control and/or the extension channel is free), MAC modules determine whether to transmit data via the control channel portion of a 40 MHz channel, via the entire 40 MHz channel, or not at all. Example channel selection systems and methods can be found in U.S. patent application Ser. No. 13/279,520, filed on Oct. 24, 2011, which is incorporated herein by reference in its entirety.

Wireless devices compliant with I.E.E.E. section 802.11 (ac), which is incorporated herein by reference in its entirety, may transmit data via an 80 MHz channel. The 80 MHz channel includes an 80 MHz band comprising two 40 MHz sub-bands, or four 20 MHz sub-bands. The sub-bands include, for example only, a primary20 channel (i.e., a primary channel corresponding to a primary 20 MHz sub-band), a secondary20 channel (i.e., a secondary channel corresponding to a secondary 20 MHz sub-band adjacent to the primary20 channel), and a secondary40 channel (i.e., a secondary channel corresponding to a secondary 40 MHz sub-band adjacent to the primary20 channel and the secondary20 channel). Accordingly, the wireless devices may receive communication (e.g., data packets) transmitted in overlapping sub-bands of the 80 MHz channel. In one implementation, the wireless devices may be required to coexist with other wireless devices, including base stations (e.g., APs), operating in different sub-bands of the 80 MHz channel.

Coexistence systems and methods according to the principles of the present disclosure detect communication activity on the sub-bands of the 80 MHz signal, determine which of the sub-bands correspond to the activity, and generate CCA signals indicating the sub-bands. Accordingly, a wireless device implementing the coexistence systems and methods may be configured to selectively transmit data packets using a selected sub-band (e.g., the primary20 channel) even though activity is present on other sub-bands of the 80 MHz channel.

Figure 4A:
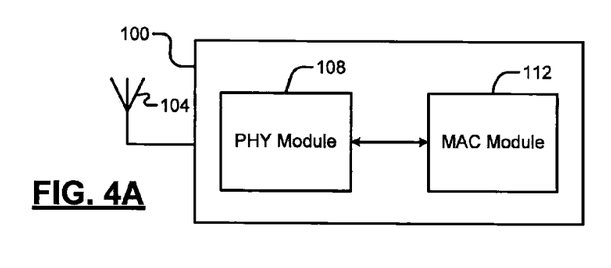
FIG. 4A is a functional block diagram of a wireless network device according to the principles of the present disclosure.
Figure 4B:
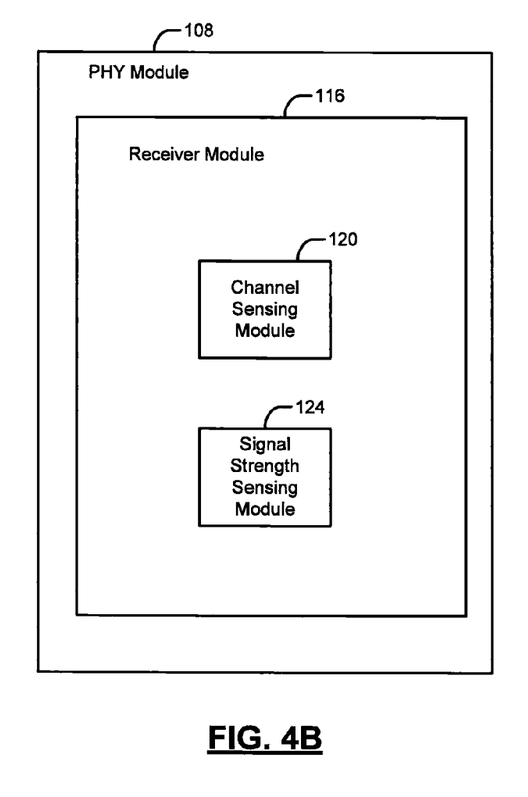
FIG. 4B is a functional block diagram of a receiver in the wireless network device of FIG. 4A according to the principles of the present disclosure.
Figure 4C:
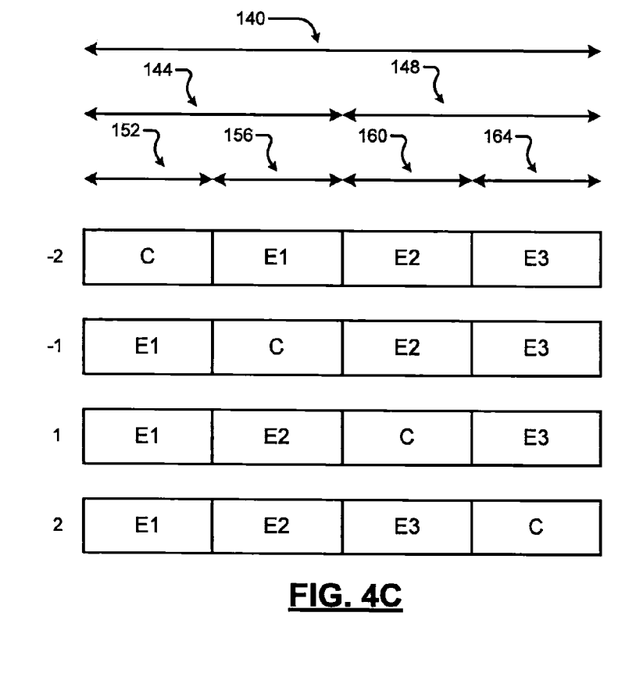
FIG. 4C illustrates arrangements of sub-bands in an 80 MHz signal according to the principles of the present disclosure.

Referring now to FIGS. 4A-4C, a wireless network device 100 that detects activity on sub-bands of an 80 MHz channel and generates various clear channel assessment (CCA) signals is shown. The device 100 may comply with I.E.E.E. section 802.11(ac) and may communicate via an 80 MHz channel that includes two 40 MHz sub-bands comprised of four 20 MHz sub-bands.

In FIG. 4A, the device 100 is shown to include an antenna 104, a physical layer (PHY) module 108, and a medium access controller (MAC) module 112. The antenna 104 may communicate received signals to the PHY module 108. The PHY module 108 may generate the CCA signals and provide the CCA signals to the MAC module 112. The MAC module 112 determines which sub-bands are available for transmitting data based on the CCA signals.

In FIG. 4B, the PHY module 108 may comprise a receiver module 116. The receiver module 116 generates CCA signals. For example, the receiver module 116 includes a channel sensing module 120 and a signal strength sensing module 124. The channel sensing module senses presence or absence of RF carriers in the various sub-bands of the 80 MHz channel, and/or may detect RF energy in the sub-bands. The signal strength sensing module 124 may determine relative signal strengths of RF signals that may be sensed in the sub-bands of the 80 MHz channel.

As shown in FIG. 4C, the 80 MHz channel 140 includes two 40 MHz sub-bands 144 and 148 and four 20 MHz sub-bands 152, 156, 160, and 164. During an initial association between the device 100 and an AP, a primary20 channel C is selected. For example, the selected primary20 channel C corresponds to one of four possible arrangements −2, −1, 1, and 2. In one implementation, each of the arrangements −2, −1, 1, and 2, when selected, corresponds to a different position of the primary20 channel C in the 80 MHz channel (e.g., a −2 sub-band position, a −1 sub-band position, a 1 sub-band position, or a 2 sub-band position). Selection of the primary20 channel C determines a position of the secondary20 channel (E1 in arrangements −2 and −1; E3 in arrangements 1 and 2) and the secondary40 channel (E2 and E3 in arrangements −2 and −1; E1 and E2 in arrangements 1 and 2).

Figure 5:
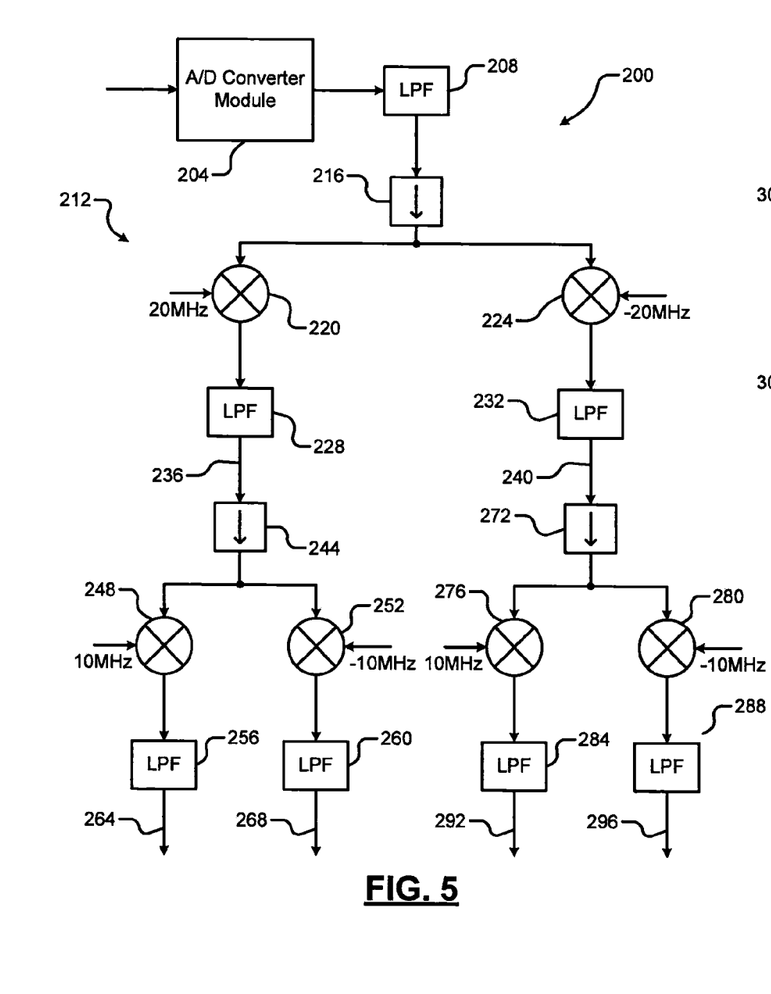
FIG. 5 is a functional block diagram of a channel sensing module according to the principles of the present disclosure.

Referring now to FIGS. 5 and 6, an example channel sensing module 200 is shown. An analog to digital (A/D) converter module 204 operating at, for example only, 160 MHz samples a received signal on an 80 MHz channel. For example only, the signal corresponds to an 80 MHz signal having sub-bands C, E1, E2, and E3 in respective 20 MHz sub-band positions −2, −1, 1, and 2 as shown in FIG. 6A. A low pass filter (LPF) 208 filters an output of the A/D converter module 204 and provides a filtered output to a digital front end 212 of the channel sensing module 200. A downsample module 216 downsamples the filtered output, which includes a 160 MHz signal, by a factor of 2, resulting in an 80 MHz downsampled signal.

Figure 6A:
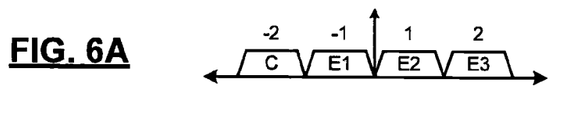
FIGS. 6A-6M illustrate signals received in sub-bands of the 80 MHz signal according to the principles of the present disclosure.
Figure 6B:
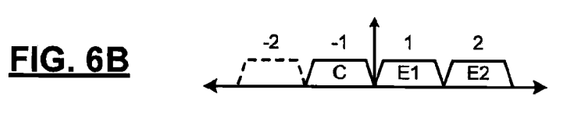
Figure 6C:
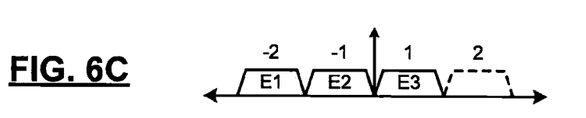
Figure 6D:
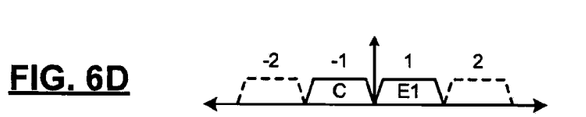
Figure 6E:
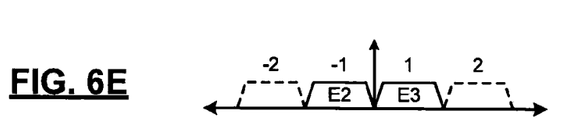

The 80 MHz signal is provided to shifter modules 220 and 224. For example only, the shifter modules 220 and 224 implement complex shifters. The shifter module 220 shifts the 80 MHz signal 20 MHz to the right (i.e., +20 MHz) as shown in FIG. 6B. Conversely, the shifter module 224 shifts the 80 MHz signal 20 MHz to the left (i.e., −20 MHz) as shown in FIG. 6C. Respective low pass filter modules 228 and 232 filter the shifted signals and output filtered signals 236 and 240 shown in FIGS. 6D and 6E, respectively. As shown in FIG. 6D, the filtered signal 236 corresponds to a 40 MHz band including the primary20 channel C and the secondary20 channel E1. Conversely, the filtered signal 240 as shown in FIG. 6E corresponds to a 40 MHz band including the secondary40 channel E2 and E3.

Figure 6F:
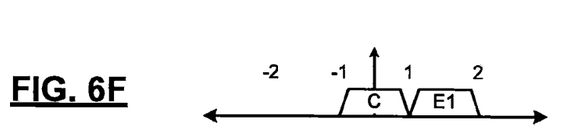
Figure 6G:
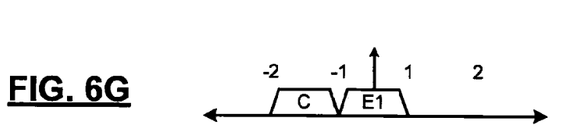
Figure 6H:
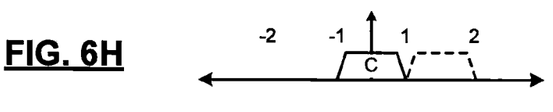
Figure 6I:
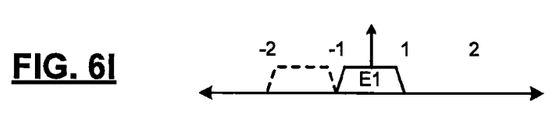

A downsample module 244 downsamples the filtered signal 236 by a factor of 2, resulting in a 40 MHz downsampled signal. A shifter module 248 shifts the 40 MHz signal 10 MHz to the right (i.e., +10 MHz) as shown in FIG. 6F. A shifter module 252 shifts the 40 MHz signal 10 MHz to the left (i.e., −10 MHz) as shown in FIG. 6G. Respective low pass filter modules 256 and 260 filter the shifted signals and output filtered signals 264 and 268 shown in FIGS. 6H and 6I, respectively. As shown in FIG. 6H, the filtered signal 264 corresponds to a 20 MHz band including the primary20 channel C. Conversely, the filtered signal 268 as shown in FIG. 6I corresponds to a 20 MHz band including the secondary 20 channel E1.

Figure 6J:
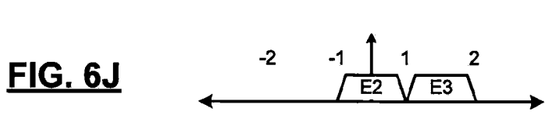
Figure 6K:
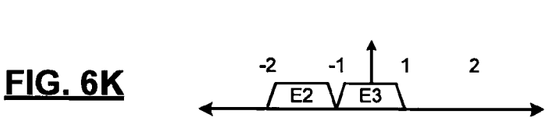
Figure 6L:
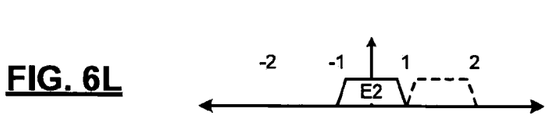
Figure 6M:
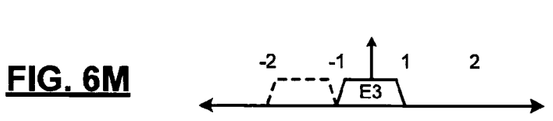

A downsample module 272 downsamples the filtered signal 240 by a factor of 2, resulting in a 40 MHz downsampled signal. A shifter module 276 shifts the 40 MHz signal 10 MHz to the right (i.e., +10 MHz) as shown in FIG. 6J. A shifter module 280 shifts the 40 MHz signal 10 MHz to the left (i.e., −10 MHz) as shown in FIG. 6K. Respective low pass filter modules 284 and 288 filter the shifted signals and output filtered signals 292 and 296 shown in FIGS. 6L and 6M, respectively. As shown in FIG. 6L, the filtered signal 292 corresponds to a 20 MHz band including the E2 sub-band of the secondary40 channel. Conversely, the filtered signal 296 as shown in FIG. 6M corresponds to a 20 MHz band including the E3 sub-band of the secondary40 channel.

Accordingly, the channel sensing module 200 isolates the sub-bands C, E1, E2, and E3 and outputs signals 264, 268, 292, and 296 corresponding to each of the 20 MHz sub-bands of the received 80 MHz signal.

Figure 7:
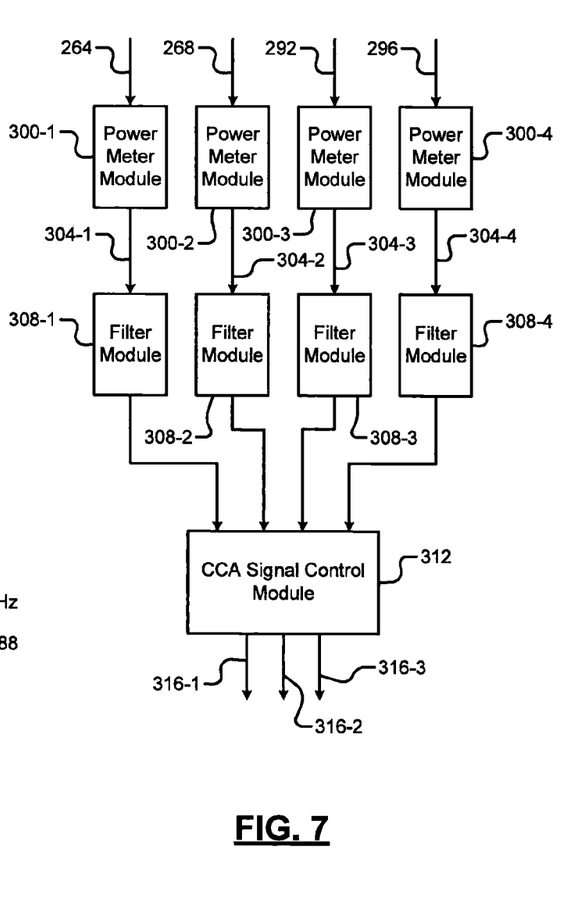
FIG. 7 is another functional block diagram of a channel sensing module according to the principles of the present disclosure.

Referring now to FIG. 7, the channel sensing module 200 further includes power meter modules 300-1, 300-2, 300-3, and 300-4, referred to collectively as power meter modules 300. The power meter modules 300 receive the signals 264, 268, 292, and 296 (e.g., respective complex number representations of the signals 264, 268, 292, and 296), determine respective magnitudes 304-1, 304-2, 304-3, and 304-4 (referred to collectively as magnitudes 304) of the signals 264, 268, 292, and 296, and output the magnitudes 304. For example only, the respective magnitudes 304 each correspond to an average of a plurality of magnitudes of the signals 264, 268, 292, and 296 over a predetermined period.

The magnitudes 304 are provided to respective filter modules 308-1, 308-2, 308-3, and 308-4, referred to collectively as filter modules 308. The filter modules 308 provide additional filtering such as, for example, further averaging the magnitudes 304 over another predetermined period to increase the accuracy of the magnitudes. Accordingly, the magnitude 304-1 corresponds to a magnitude of a control channel (e.g., the primary20 channel C), and the magnitudes 304-2, 304-3, and 304-4 correspond to magnitudes of extension channels (e.g., the secondary20 channel E1, and the secondary40 channels E2 and E3).

A CCA signal control module 312 receives the magnitudes 304 and generates CCA signals 316-1, 316-2, and 316-3, referred to collectively as CCA signals 316, based on the magnitudes 304. For example, the CCA signal 316-1 is a primary20 CCA signal (e.g., CCA_Pri20) indicating whether activity is detected on the primary20 channel. For example only, the CCA signal 316-1 is high (e.g., a "1") when activity is detected and is low (e.g., a "0") when activity is not detected. Similarly, the CCA signal 316-2 is a secondary20 CCA signal (e.g., CCA_Sec20) indicating whether activity is detected on the secondary20 channel and the CCA signal 316-3 is a secondary40 CCA signal (e.g., CCA_Sec40) indicating whether activity is detected on the secondary40 channel.

The CCA signal control module 312 determines the CCA signals 316 based on, for example, comparisons between the magnitudes 304 and one or more thresholds. For example only, the CCA signal control module 312 determines that activity is present (e.g., a data packet is being received) on a sub-band if the corresponding magnitude of that sub-band (C1, E1, E2, or E3) is greater than or equal to a threshold TH.

Conversely, the CCA signal control module 312 determines that activity is not present on the sub-band if the corresponding magnitude is less than the threshold TH. The threshold TH for each sub-band may be the same or may be different.

For example only, if C>=TH, E1>=TH, E2>=TH, and E3>=TH, then the CCA signal control module 312 determines that there is activity on each of the sub-bands C, E1, E2, and E3, which may indicate that an 80 MHz packet is being received. Accordingly, the CCA signal control module 312 may store an indication that an 80 MHz packet is being received. For example, a value of PKT_P80 may be set to indicate whether an 80 MHz packet is being received (e.g., PKT_P80 is set to "1" if an 80 MHz packet is being received and "0" if an 80 MHz packet is not being received). The CCA signal control module 312 may use other calculations to determine whether an 80 MHz packet is being received. For example, if a difference between a maximum of C, E1, E2, and E3 and a minimum of C1, E1, E2, and E3 is less than a threshold (e.g., if [max {C1, E1, E2, E3}-min {C, E1, E2, E3}]<TH), then the CCA signal control module 312 determines that an 80 MHz packet is being received.

Similarly, the CCA signal control module 312 determines that there is activity on the primary20 channel if C>=TH and C-max {E1, E2, E3}>=TH. In one implementation, the CCA signal control module 312 determines that there is activity on the primary20 channel if C is sufficiently high and E1, E2, and E3 are sufficiently low. Accordingly, the CCA signal control module 312 sets a value of PKT_P20 to indicate whether a packet is being received on the primary20 channel.

The CCA signal control module 312 determines that there is activity on the secondary20 channel if E1>=TH and C-max {C, E2, E3}>=TH. In one implementation, the CCA signal control module 312 determines that there is activity on the secondary20 channel if E1 is sufficiently high and C, E2, and E3 are sufficiently low. Accordingly, the CCA signal control module 312 sets a value of PKT_S20 to indicate whether a packet is being received on the secondary20 channel.

The CCA signal control module 312 determines that there is activity on the primary40 channel (e.g., a data packet is being received on both the primary20 channel and the secondary20 channel) if C1>=TH, E1>=TH, and [C1+E1-E2-E3]>=TH. In one implementation, the CCA signal control module 312 determines that there is activity on the primary40 channel if C1 and E1 are sufficiently high and E2 and E3 are sufficiently low. Accordingly, the CCA signal control module 312 sets a value of PKT_P40 to indicate whether a packet is being received on the primary40 channel.

The CCA signal control module 312 determines that there is activity on the E2 channel (e.g., a data packet is being received on E2 but not E3) if E2>=TH and E2-max {C, E1, E3}>=TH. In one implementation, the CCA signal control module 312 determines that there is activity on the E2 channel if E2 is sufficiently high and C, E1, and E3 are sufficiently low. Accordingly, the CCA signal control module 312 sets a value of PKT_S(E2) to indicate whether a packet is being received on the E2 channel.

The CCA signal control module 312 determines that there is activity on the E3 channel (e.g., a data packet is being received on E3 but not E2) if E3>=TH and E3-max {C, E1, E2}>=TH. In one implementation, the CCA signal control module 312 determines that there is activity on the E3 channel if E3 is sufficiently high and C, E1, and E2 are sufficiently low. Accordingly, the CCA signal control module 312 sets a value of PKT_S(E3) to indicate whether a packet is being received on the E3 channel.

The CCA signal control module 312 determines that there is activity on the secondary40 channel (e.g., a data packet is being received on both E2 and E3) if E2>=TH, E3>=TH, and [E2+E3-C-E1]>=TH. In one implementation, the CCA signal control module 312 determines that there is activity on the secondary40 channel if E2 and E3 are sufficiently high and C and E1 are sufficiently low. Or, the CCA signal control module 312 may determine that there is activity on the secondary40 channel if either of PKT_S(E2) or PKT_S(E3) goes high (e.g., is set to "1"). Accordingly, the CCA signal control module 312 sets a value of PKT_S40 to indicate whether a packet is being received on the secondary40 channel.

Accordingly, the values of PKT_P80, PKT_P20, PTK_S20, PKT_P40, PKT_S(E2), PKT_S(E3), and PKT_S40 indicate whether there is activity on the corresponding sub-bands of the 80 MHz channel. If there is activity on one or more of the sub-bands, then the device 100 is not able to transmit a data packet on those sub-bands. However, if there is activity on any of the secondary sub-bands but not on the primary20 channel, then the device 100 is still able to transmit a data packet on the primary20 channel. The channel sensing module 120 communicates with the MAC module 112 to indicate which of the sub-bands are receiving a data packet to allow the MAC module 112 to selectively transmit a data packet on a sub-band (e.g., the primary20 channel) that is not receiving a data packet.

In some circumstances, the device 100 may be operating within range of multiple overlapping base stations (MOBSS). Consequently, activity corresponding to multiple types of data packets may be detected on multiple sub-bands (e.g., E1, E2, and/or E3). For example, if no activity is detected on the primary20 channel (e.g., C<=TH), there are three possible combinations of detected activity on the secondary sub-bands: both E1 and E2 simultaneously; both E1 and E3 simultaneously; and each of E1, E2, and E3 simultaneously. Although simultaneous activity on E2 and E3 is also possible, such a situation is indicated by the value of PKTS40. Accordingly, the CCA signal control module 312 may detect overlapping activity if C<=TH, E1>=TH, and (E2>=TH or E3>=TH). In one implementation, the CCA signal control module 312 may detect overlapping activity if C is sufficiently low, E1 is sufficiently high, and either E2 or E3 is sufficiently high. In this state, only the primary20 channel is available, so the CCA signal control module 312 may set the value of PKT_S20 to indicate that a packet is being received on the secondary20 channel. In one implementation, regardless of which of E2 or E3 is receiving a data packet, only the primary20 channel is available because the secondary20 channel is also receiving a data packet.

The CCA signals 316 are provided to the MAC module 112 (as shown in FIG. 4A) to indicate any activity that is detected on each of the sub-bands. Accordingly, the MAC module 112 can selectively transmit a data packet on the primary20 channel (and/or the primary40 channel) based on whether activity is detected on the primary20 channel or the primary40 channel, even if activity is detected on the secondary 20 channel and/or the secondary40 channel. The CCA signals 316 may also indicate, for example, which control symbol timing/frame synchronization boundaries to use to receive data packets on the primary20 channel. For example only, the control symbol timing may be indicated with a 4-bit value corresponding to C, E1, E2, and E3.

Figure 8:
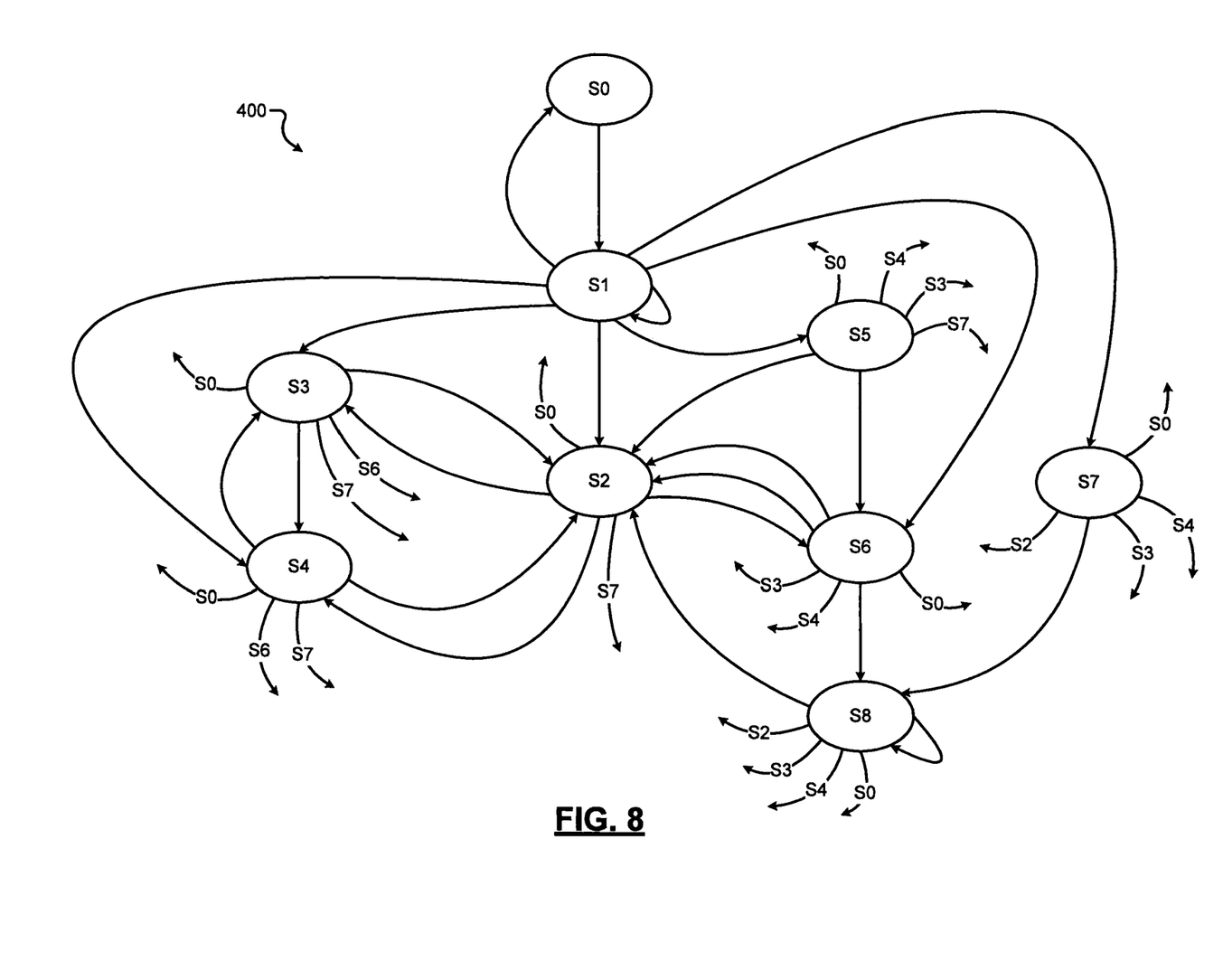
FIG. 8 illustrates a state machine corresponding to states of the wireless network device according to the principles of the present disclosure.

Referring now to FIG. 8, the CCA signal control module 312 may implement a state machine 400 according to the CCA signals 316. Each of the states S0-S8 corresponds to, for example, whether activity is detected on different combinations of the sub-bands. Accordingly, the state machine 400 determines whether the device 100 is able to transmit a data packet on a given sub-band of the 80 MHz channel.

In the S0 state, the device 100 waits to detect activity on any of the sub-bands. If any activity is detected (e.g., via carrier sensing), the state machine 400 transitions to the S1 state. In the S1 state, the state machine 400 waits a predetermined time to determine a packet type (i.e., which sub-bands the packet is being received on). For example, the predetermined time allows the power meter modules 300 and other components sufficient time to collect and calculate any values needed to determine which sub-bands are receiving a data packet. The state machine 400 transitions from the S1 state to any of the states S2-S8 based on the detected activity. The state machine 400 can transition from any of the states S1-S8 to the S0 state if, at any time, activity is no longer detected.

For example only, the state machine 400 transitions to the S2 state if activity is detected on all four sub-bands (e.g., an 80 MHz packet is being received, and PKT_P80=1). The state machine 400 is configured to transition to the S2 state from any of the states S1 and S3-S8. The state machine 400 transitions to the S3 state if activity is detected on the primary40 channel (e.g., PKT_P40=1). The state machine 400 is configured to transition to the S3 state from any of the states S1, S2, and S4-S8. The state machine 400 transitions to the S4 state if activity is detected on the primary20 channel (e.g., PKT_P20=1). The state machine 400 is configured to transition to the S4 state from any of the states S1-53 and S5-S8

The state machine 400 transitions to the S5 state if activity is detected on the secondary20 channel (e.g., PKT_S20=1) and the secondary40 channel (e.g., PKT_S40=1). The state machine 400 is configured to transition to the S5 state from the S1 state. In one implementation, the S5 state corresponds to activity being detected on the secondary20 channel and one or both of E2 and E3 of the secondary40 channel.

The state machine 400 transitions to the S6 state if activity is detected on the secondary40 channel (e.g., PKT_S40=1). The state machine 400 is configured to transition to the S6 state from any of the states S1-S5. The state machine 400 transitions to the S7 state if activity is detected on the secondary20 channel (e.g., PKT_S20=1). The state machine 400 is configured to transition to the S7 state from any of the states S1-S5. The S8 state is a transitional state between S6 or S7 and states S0, S2, S3, and S4.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module and/or circuit may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A wireless network device, comprising:
a physical layer (PHY) module configured to
i) communicate with an 80 MHz channel, wherein the 80 MHz channel includes a plurality of sub-bands including a first sub-band, a second sub-band, a third sub-band, and a fourth sub-band, and wherein one of the plurality of sub-bands corresponds to a primary channel,
ii) selectively shift a first signal received via the 80 MHz channel in a first direction and/or a second direction,
iii) determine, based on the shifted first signal, which of the plurality of sub-bands are receiving a data packet, and
iv) generate at least one clear channel assessment signal indicating which of the plurality of sub-bands are receiving the data packet; and
a media access control (MAC) module configured to i) receive the at least one clear channel assessment signal from the PHY module, and ii) selectively transmit on the primary channel based on the at least one clear channel assessment signal.

2. The wireless network device of claim 1, wherein:
the first sub-band corresponds to a primary 20 MHz channel;
the first sub-band and the second sub-band correspond to a primary 40 MHz channel;
the second sub-band corresponds to a secondary 20 MHz channel; and
the third sub-band and the fourth sub-band correspond to a secondary 40 MHz channel.

3. The wireless network device of claim 1, wherein the PHY module is configured to generate the at least one clear channel assessment signal based on respective magnitudes of portions of the shifted first signal received via the 80 MHz channel, wherein the portions correspond to respective ones of the first sub-band, the second sub-band, the third sub-band, and the fourth sub-band.

4. A wireless network device, comprising:
a physical layer (PHY) module configured to
i) communicate with an 80 MHz channel, wherein the 80 MHz channel includes a plurality of sub-bands including a first sub-band, a second sub-band, a third sub-band, and a fourth sub-band, and wherein one of the plurality of sub-bands corresponds to a primary channel,
ii) determine which of the plurality of sub-bands are receiving a data packet, and
iii) generate at least one clear channel assessment signal indicating which of the plurality of sub-bands are receiving the data packet; and
a media access control (MAC) module configured to i) receive the at least one clear channel assessment signal from the PHY module, and ii) selectively transmit on the primary channel based on the at least one clear channel assessment signal,
wherein the PHY module is configured to i) receive a first signal via the 80 MHz channel, ii) selectively shift the first signal in a first direction and a second direction, and selectively filter the first signal to isolate portions of the first signal corresponding to each of the first sub-band, the second sub-band, the third sub-band, and the fourth sub-band, and iii) generate the at least one clear channel assessment signal based on magnitudes of the isolated portions.

5. A wireless network device, comprising:
a physical layer (PHY) module configured to
i) communicate with an 80 MHz channel, wherein the 80 MHz channel includes a plurality of sub-bands including a first sub-band, a second sub-band, a third sub-band, and a fourth sub-band, and wherein one of the plurality of sub-bands corresponds to a primary channel,
ii) determine which of the plurality of sub-bands are receiving a data packet, and
iii) generate at least one clear channel assessment signal indicating which of the plurality of sub-bands are receiving the data packet; and
a media access control (MAC) module configured to i) receive the at least one clear channel assessment signal from the PHY module, and ii) selectively transmit on the primary channel based on the at least one clear channel assessment signal,
wherein the PHY module includes a channel sensing module configured to i) receive a first signal via the 80 MHz channel, ii) selectively shift the first signal by 20 MHz in a first direction to isolate the first sub-band and the second sub-band in a second signal; and iii) selectively shift the first signal by 20 MHz in a second direction to isolate the third sub-band and the fourth sub-band in a third signal.

6. The wireless network device of claim 5, wherein the channel sensing module is configured to i) selectively shift the second signal by 10 MHz in the first direction to isolate the first sub-band in a fourth signal, and ii) selectively shift the second signal by 10 MHz in the second direction to isolate the second sub-band in a fifth signal.

7. The wireless network device of claim 6, wherein the channel sensing module is configured to i) selectively shift the third signal by 10 MHz in the first direction to isolate the third sub-band in a sixth signal, and ii) selectively shift the third signal by 10 MHz in the second direction to isolate the fourth sub-band in a seventh signal.

8. The wireless network device of claim 7, wherein the channel sensing module is configured to determine respective magnitudes of the fourth signal, the fifth signal, the sixth signal, and the seventh signal.

9. The wireless network device of claim 8, wherein the channel sensing module is configured to generate the at least one clear channel assessment signal based on the respective magnitudes.

10. The wireless network device of claim 9, wherein the channel sensing module is configured to generate the at least one clear channel assessment signal based on a comparison between the respective magnitudes and at least one threshold.

11. A method of operating a wireless network device, the method comprising:
communicating with an 80 MHz channel including a plurality of sub-bands, the sub-bands including a first sub-band, a second sub-band, a third sub-band, and a fourth sub-band, wherein one of the plurality of sub-bands corresponds to a primary channel;
selectively shifting a first signal received via the 80 MHz channel in a first direction and/or a second direction;
determining, based on the shifted first signal, which of the plurality of sub-bands are receiving a data packet;
generating at least one clear channel assessment signal indicating which of the plurality of sub-bands are receiving the data packet; and
selectively transmitting on the primary channel based on the at least one clear channel assessment signal.

12. The method of claim 11, wherein:
the first sub-band corresponds to a primary 20 MHz channel;
the first sub-band and the second sub-band correspond to a primary 40 MHz channel;
the second sub-band corresponds to a secondary 20 MHz channel; and
the third sub-band and the fourth sub-band correspond to a secondary 40 MHz channel.

13. The method of claim 11, wherein generating the at least one clear channel assessment signal includes generating the at least one clear channel assessment signal based on respective magnitudes of portions of the shifted first signal received via the 80 MHz channel, and wherein the portions correspond to respective ones of the first sub-band, the second sub-band, the third sub-band, and the fourth sub-band.

14. A method of operating a wireless network device, the method comprising:
communicating with an 80 MHz channel including a plurality of sub-bands, the sub-bands including a first sub-band, a second sub-band, a third sub-band, and a fourth sub-band, wherein one of the plurality of sub-bands corresponds to a primary channel;
determining which of the plurality of sub-bands are receiving a data packet;
generating at least one clear channel assessment signal indicating which of the plurality of sub-bands are receiving the data packet;
selectively transmitting on the primary channel based on the at least one clear channel assessment signal;
receiving a first signal via the 80 MHz channel;
selectively shifting the first signal in a first direction and a second direction;
selectively filtering the first signal to isolate portions of the first signal corresponding to each of the first sub-band, the second sub-band, the third sub-band, and the fourth sub-band; and
generating the at least one clear channel assessment signal based on magnitudes of the isolated portions.

15. A method of operating a wireless network device, the method comprising:
communicating with an 80 MHz channel including a plurality of sub-bands, the sub-bands including a first sub-band, a second sub-band, a third sub-band, and a fourth sub-band, wherein one of the plurality of sub-bands corresponds to a primary channel;

determining which of the plurality of sub-bands are receiving a data packet;

generating at least one clear channel assessment signal indicating which of the plurality of sub-bands are receiving the data packet;

selectively transmitting on the primary channel based on the at least one clear channel assessment signal;

receiving a first signal via the 80 MHz channel;

selectively shifting the first signal by 20 MHz in a first direction to isolate the first sub-band and the second sub-band in a second signal; and selectively shifting the first signal by 20 MHz in a second direction to isolate the third sub-band and the fourth sub-band in a third signal.

16. The method of claim 15, further comprising:

selectively shifting the second signal by 10 MHz in the first direction to isolate the first sub-band in a fourth signal; and selectively shifting the second signal by 10 MHz in the second direction to isolate the second sub-band in a fifth signal.

17. The method of claim 16, further comprising:

selectively shifting the third signal by 10 MHz in the first direction to isolate the third sub-band in a sixth signal; and selectively shifting the third signal by 10 MHz in the second direction to isolate the fourth sub-band in a seventh signal.

18. The method of claim 17, further comprising determining respective magnitudes of the fourth signal, the fifth signal, the sixth signal, and the seventh signal.

19. The method of claim 18, wherein generating the at least one clear channel assessment signal includes generating the at least one clear channel assessment signal based on the respective magnitudes.

20. The method of claim 19, wherein generating the at least one clear channel assessment signal includes generating the at least one clear channel assessment signal based on a comparison between the respective magnitudes and at least one threshold.

* * * * *